United States Patent
Saitou (10) Patent No.: US 9,140,969 B2
(45) Date of Patent: Sep. 22, 2015

(54) ILLUMINATION OPTICAL SYSTEM AND PROJECTOR USING THE SAME

(75) Inventor: Hiroyuki Saitou, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 159 days.

(21) Appl. No.: 13/816,472

(22) PCT Filed: Sep. 16, 2010

(86) PCT No.: PCT/JP2010/066074
§ 371 (c)(1),
(2), (4) Date: Feb. 11, 2013

(87) PCT Pub. No.: WO2012/035636
PCT Pub. Date: Mar. 22, 2012

(65) Prior Publication Data
US 2013/0135593 A1 May 30, 2013

(51) Int. Cl.
G03B 21/16 (2006.01)
G03B 21/20 (2006.01)
G03B 33/12 (2006.01)
H04N 9/31 (2006.01)
F21V 9/16 (2006.01)
F21V 14/08 (2006.01)
G03B 21/00 (2006.01)

(52) U.S. Cl.
CPC . *G03B 21/16* (2013.01); *F21V 9/16* (2013.01); *F21V 14/08* (2013.01); *G03B 21/005* (2013.01); *G03B 21/204* (2013.01); *G03B 21/2006* (2013.01); *G03B 21/2013* (2013.01); *G03B 33/12* (2013.01); *H04N 9/3105* (2013.01); *H04N 9/3129* (2013.01); *H04N 9/3161* (2013.01)

(58) Field of Classification Search
CPC ..................................................... G03B 21/204
USPC .................. 353/84, 30, 31, 94; 362/260, 800
See application file for complete search history.

(56) References Cited

U.S. PATENT DOCUMENTS 8,616,708 B2 * 12/2013 Masuda ........................ 353/84

FOREIGN PATENT DOCUMENTS

| JP | 05-083722 A | 4/1993 |
|---|---|---|
| JP | 2003-186110 A | 7/2003 |
| JP | 2010-085740 A | 4/2010 |
| JP | 2010-086815 A | 4/2010 |
| JP | 2010-164846 A | 7/2010 |
| JP | 2010-217566 A | 9/2010 |
| JP | 2010-225392 A | 10/2010 |

OTHER PUBLICATIONS

International Search Report dated Nov. 9, 2010 in PCT/JP2010/066704, with English translation thereof.

* cited by examiner

*Primary Examiner* — William C Dowling
*Assistant Examiner* — Ryan Howard
(74) *Attorney, Agent, or Firm* — McGinn IP Law Group, PLLC (57) ABSTRACT

An illumination optical system includes: a light source that generates excitation light; a fluorescent body that generates fluorescent light by irradiation with the excitation light and that is disposed in a region wider than the irradiation spot of the excitation light; a plate in which the fluorescent body is disposed; and a driving mechanism that moves the plate so that the irradiation spot of the excitation light can intermittently move over the fluorescent body.

13 Claims, 9 Drawing Sheets

ILLUMINATION OPTICAL SYSTEM AND PROJECTOR USING THE SAME

TECHNICAL FIELD

The present invention relates to an illumination optical system including a fluorescent body for generating fluorescent light by excitation light from a light source, and a projector including the illumination optical system.

BACKGROUND

There have been offered various illumination optical systems used in projectors such as a LED (Liquid Crystal Display) projector and a DLP (Digital Light Processing) projector.

JP 2010-86815A (hereinafter, Patent Literature 1) discloses an illumination optical system that irradiates a fluorescent body with excitation light emitted from a laser light source to acquire illumination light from the fluorescent body. In the illumination optical system disclosed in Patent Literature 1, the irradiation spot of the excitation light is periodically moved over the fluorescent body by rotating or moving a substrate on which the fluorescent body is disposed. This may prevent the reduction of light emission efficiency caused by a temperature increase.

CITATION LIST

Patent Literature 1: JP 2010-86815A

SUMMARY

Technical Problem

In Patent Literature 1, during the operation of the illumination optical system, the substrate on which the fluorescent body is disposed is always rotated or vibrated, and a diving mechanism (motor) for driving the substrate always continues its operation. Consequently, the service life of the driving mechanism is short. The service life of the driving mechanism may determine the service life of the illumination optical system. Since the driving mechanism is always in an operated state, noise may increase or abnormal sound may be generated due to the abrasion of a component such as a bearing included in the driving mechanism.

It is therefore desired to prevent the decreased service life and noise caused by the driving mechanism included in the illumination optical system.

Solution to Problem

According to an aspect of the present invention, there is provided an illumination optical system capable of preventing decreased service life, noise, and the like caused by a driving mechanism disposed in the illumination optical system. The illumination optical system includes: a light source that generates excitation light; a fluorescent body that generates fluorescent light by irradiation with the excitation light and that is disposed in a region wider than the irradiation spot of the excitation light; a plate in which the fluorescent body is disposed; and a driving mechanism that moves the plate so that the irradiation spot of the excitation light can intermittently move over the fluorescent body.

According to the present invention, since the driving mechanism intermittently operates at predetermined timing, a decrease in the service life of the driving mechanism can be prevented. Further, the increase of noise or the generation of abnormal sound caused by the abrasion or the like of the driving mechanism can be prevented.

The above and other objects, features and advantages of the present invention will be apparent from the following description of the preferred embodiments of the invention in conjunction with the accompanying drawings.

DESCRIPTION OF EMBODIMENT

The embodiments of the present invention will be described with reference to the drawings.

Figure 1:
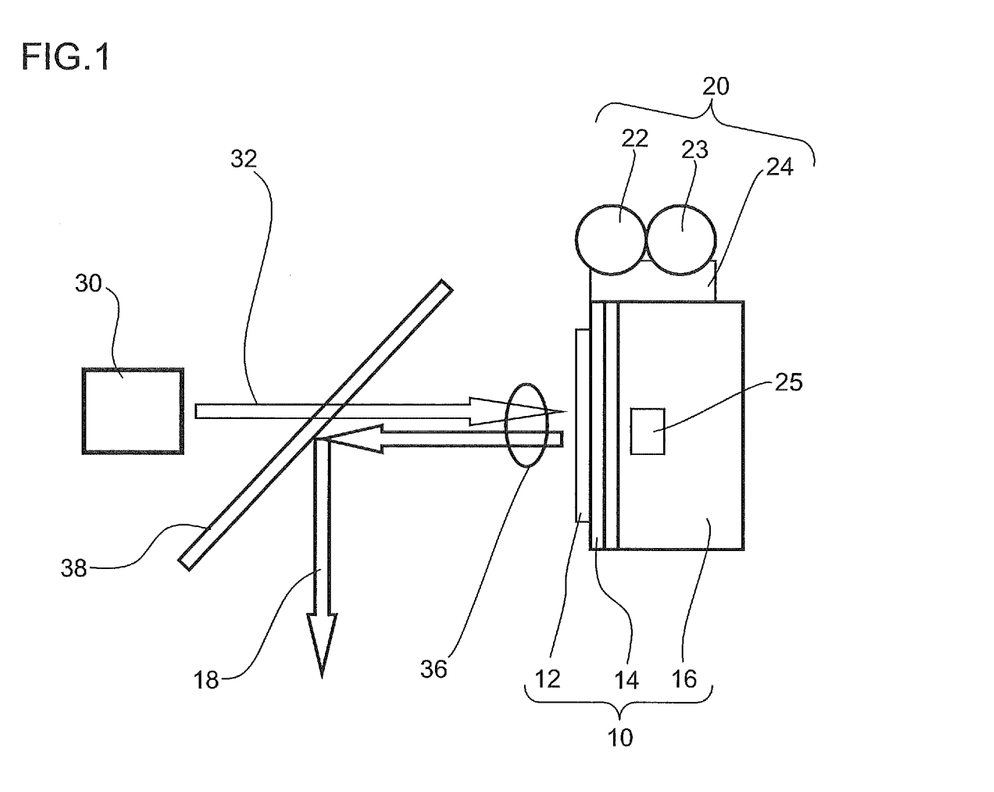
FIG. 1 is a schematic view showing the configuration of an illumination optical system according to the first embodiment of the present invention.

FIG. 1 is a schematic view showing the configuration of an illumination optical system according to the first embodiment of the present invention. The illumination optical system includes laser light source 30, fluorescent body unit 10 and driving mechanism 20. Laser light source 30, for which, for example, a laser diode (LD) is used, generates excitation laser light (excitation light) 32.

Fluorescent body unit 10 includes fluorescent body 12 and plate 14 in which fluorescent body 12 is disposed. Fluorescent body 12 generates fluorescent light 18 having a wavelength longer than that of excitation light 32 by irradiation with excitation light 32. Fluorescent body unit 10 can include a transparent sealing resin for sealing fluorescent body 12. Driving mechanism 20 moves plate 14 in which fluorescent body 12 is disposed. To prevent the decrease of the service life of fluorescent body 12 caused by heat, it is desirable for fluorescent body unit 10 to include heatsink 16 in order to cool fluorescent body 12.

Excitation light 32 for exciting fluorescent body 12, which is required to be light having a wavelength shorter than that of fluorescent light 18, is not limited to coherent light such as a laser beam. In such a case, various light sources can be used in place of laser light source 30.

When the light source of excitation light 32 for exciting fluorescent body 12 is a laser, the area of the irradiation spot of the excitation light can be very small, thus reducing the radiation area of fluorescent body 12. As a result, a highly efficient illumination optical system of limited etendue can be configured.

It is desirable for the illumination optical system to include light collection optical system 36 and dichroic mirror 38. Light collection optical system 36 can include one condenser lens, or a plurality of lens groups.

Dichroic mirror 38 transmits excitation light 32 while reflecting fluorescent light 18 from fluorescent body 12. In FIG. 1, laser beam 32 emitted from laser light source 30 permeate through dichroic mirror 38, and through light collection optical system 36 to enter fluorescent body 12. Fluorescent light 18 generated at fluorescent body 12 enters light collection optical system 36 again to be reflected by dichroic mirror 38. Dichroic mirror 38 separates the routes of excitation light 32 from laser light source 30 and fluorescent light 18 from fluorescent body 12 from each other.

Different from the case shown in FIG. 1, dichroic mirror 38 can transmit fluorescent light 18 from fluorescent body 12 while reflecting excitation light 32. In this case, laser light source 30 is appropriately located. Further, if the routes of excitation light 32 and fluorescent light 18 can be separated from each other by obliquely applying laser beam 32 to fluorescent body 12, dichroic mirror 38 is unnecessary.

Figure 2:
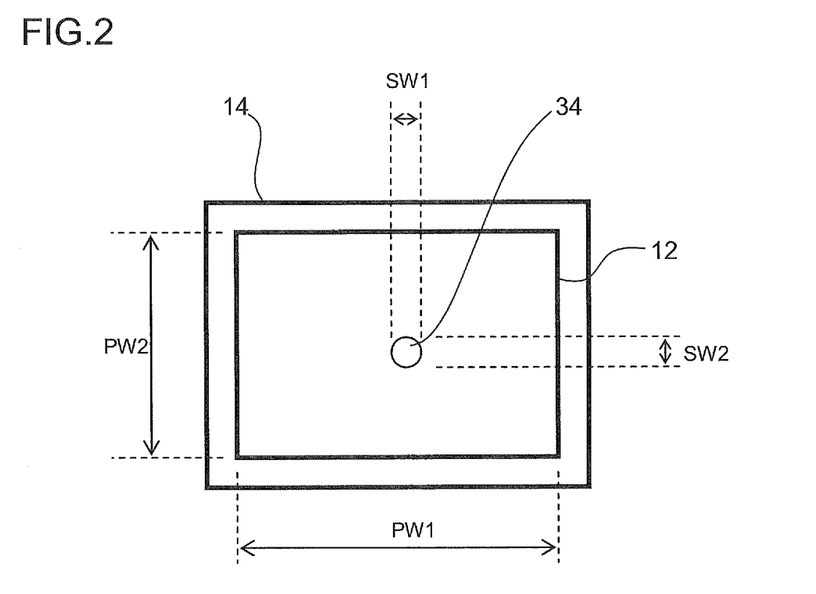
FIG. 2 is a plan view showing a fluorescent body unit seen in a right direction from a left side shown in FIG. 1.

FIG. 2 is a plan view showing fluorescent body unit 10 seen in a right direction from a left side shown in FIG. 1. Plate 14 includes fluorescent body 12 disposed in a region wider than irradiation spot 34 of the excitation light. As shown in FIG. 2, desirably, fluorescent body 12 is two-dimensionally disposed more widely than irradiation spot 34 of the excitation light.

Figure 3:
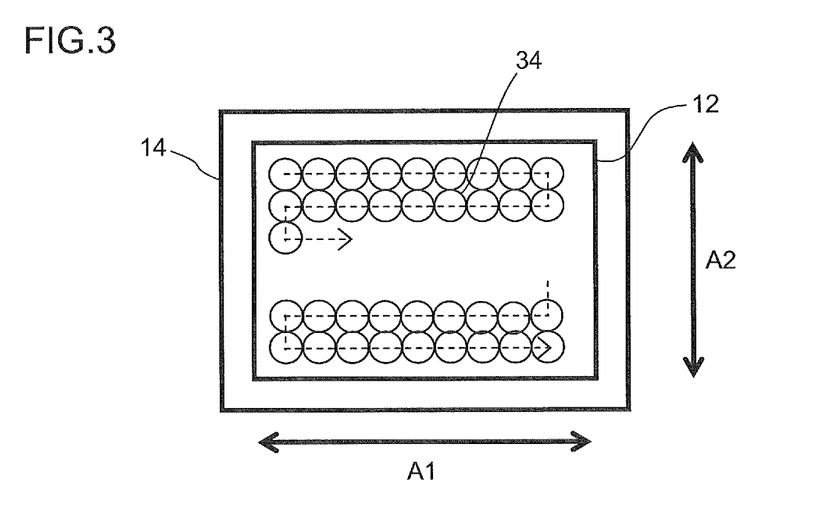
FIG. 3 is a schematic view showing a change in relative position between the irradiation spot of excitation light and a fluorescent body.

Driving mechanism 20 intermittently moves plate 14 so that irradiation spot 34 of the excitation light can move over fluorescent body 12 when a predetermined time elapses after the start of irradiating the predetermined position of fluorescent body 12 with the excitation light. FIG. 3 shows an example of the movement of irradiation spot 34 over fluorescent body 12. Irradiation spot 34 is not always at the same position over the fluorescent body. Thus, any decrease in the service life of the illumination optical system caused by deterioration of fluorescent body 12 or by the sealing resin for sealing the fluorescent body will be prevented.

According to the embodiment, driving mechanism 20 is not constantly operated but intermittently operated, and thus the decrease of the service life of driving mechanism 20 is prevented. The increase of noise or the generation of abnormal sound caused by the abrasion of a component included in driving mechanism 20 can be prevented. Further, sound is generated from driving mechanism 20 only during driving. Thus, the generation frequency of sound from driving mechanism 20 can be reduced.

As an example, driving mechanism 20 includes first motor 22 for moving plate 14 along first axis A1 within a plane where fluorescent body 12 is located, and second motor 23 for moving plate 14 along second axis A2 orthogonal to first axis A1 (also refer to FIG. 1). In other words, plate 14 is configured to be two-dimensionally movable along the plane where fluorescent body 12 is located. The two-dimensional movement of irradiation spot 34 over fluorescent body 12 enables prevention of a decrease in the service life of the illumination optical system more than one-dimensional movement.

Desirably, driving mechanism 20 includes a conversion mechanism (not shown) for converting the rotation of first motor 22 or second motor 23 into linear movement of plate 14, and a reduction gear (not shown). The conversion mechanism and the reduction gear are housed in gear box 24.

When the same position is continuously irradiated with the excitation light, due to a temperature increase or to the power of the excitation light, the sealing resin for sealing fluorescent body 12 is deteriorated to reach the end of its service life. According to the embodiment, the service life of the illumination optical system is improved by moving plate 14 at predetermined timing to change the position of irradiation spot 34 of the excitation light with respect to fluorescent body 12. For example, when the area of a region where fluorescent body 12 is located (PW1×PW2) is larger by about 20 times than the irradiation spot diameter of the excitation light (about SW1×SW2), the service life of the illumination optical system will be larger by about 20 times than that of the fluorescent body. As an example, when the service life of the fluorescent body is 2000 hours, the service life of the illumination optical system can be up to 40000 hours.

Driving mechanism 20 can be driven at regular time intervals based on the service life of fluorescent body 12. For example, driving mechanism 20 can be driven at the time of starting use of the illumination optical system, and driven at each fixed time (basic time) thereafter. The basic time is desirably set based on, for example, the service life of fluorescent body 12 when the same position over fluorescent body 12 is continuously irradiated with the excitation light. The basic time is appropriately set by experiment carried out beforehand.

Timing for driving driving mechanism 20 can be set based on not only the service life of fluorescent body 12 but also the temperature of fluorescent body 12 or the sealing resin. For example, when the temperature of fluorescent body 12 or the sealing resin exceeds a predetermined value determined beforehand by experiment, driving mechanism 20 can be driven at timing set by subtracting a predetermined value from the basic time. In this case, desirably, fluorescent body unit 10 includes temperature sensor 25 for measuring the temperature of fluorescent body 12 or the sealing resin.

Further, the timing for driving driving mechanism 20 can be set in view of the power density of the excitation light. Specifically, with respect to basic time H, when a temperature T is higher than a predetermined value and the power P of the excitation light is larger than a predetermined value, the timing for driving driving mechanism 20 can be set to "H-αT-βP", in which α and β are positive real number parameters determined beforehand by experiment.

For example, when the temperature of fluorescent body 12 is 80° C. and the power of the excitation light is 1 W, plate 14 is moved for every 100 hours. When the temperature increases to 100° C., plate 14 is moved for every 2 hours.

Thus, the timing for driving driving mechanism 20 is appropriately set based on the service life of fluorescent body 12, the temperature of the fluorescent body, or on the power of the excitation light in view of the purpose of the illumination optical system. Plate 14 including the fluorescent body is operated intermittently at a predetermined time but not constantly. This can prolong the service life of driving mechanism 20.

Figure 4:
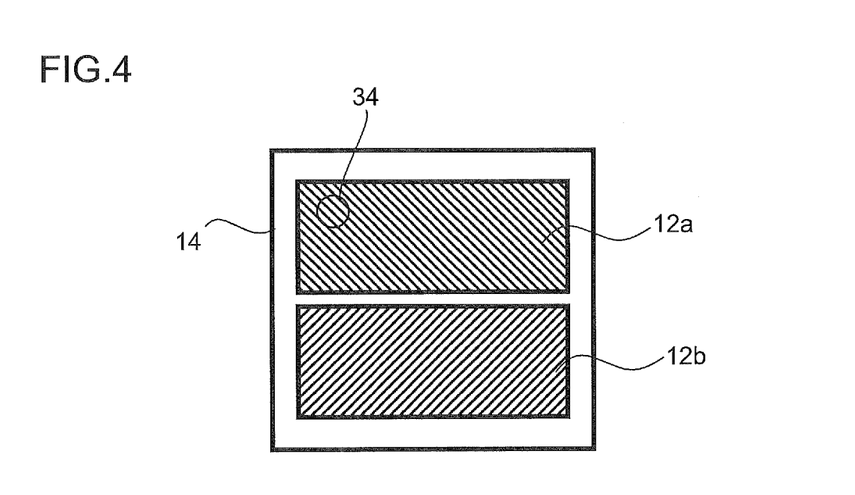
FIG. 4 is a schematic view showing a fluorescent body unit included in an illumination optical system according to a second embodiment.

FIG. 4 is a schematic view showing a fluorescent body unit included in an illumination optical system according to a second embodiment. In this fluorescent body unit, plate 14 includes two types of fluorescent bodies 12a and 12b. Each of first fluorescent body 12a and second fluorescent body 12b emits fluorescent light having a wavelength longer than that of excitation light from a laser light source. The wavelength of the fluorescent light emitted from first fluorescent body 12a and the wavelength of the fluorescent light emitted from second fluorescent body 12b are different from each other. Each of first and second fluorescent bodies 12a and 12b is disposed in a region wider than irradiation spot 34 of the excitation light.

As described above, driving mechanism 20 can move plate 14 at predetermined timing so that irradiation spot 34 of the excitation light can move over fluorescent bodies 12a and 12b. Further, driving mechanism 20 can move plate 14 so that irradiation spot 34 of the excitation light can move from over first fluorescent body 12a to over second fluorescent body 12b.

In FIG. 4, by vertically moving plate 14, irradiation spot 34 of the excitation light moves between first fluorescent body 12a and second fluorescent body 12b. This enables switching of the wavelength (color) of light emitted from the illumination optical system.

For example, it can be set that first fluorescent body 12a emits green fluorescent light corresponding to the chromaticity zone of sRGB, and second fluorescent body 12b emits green fluorescent light corresponding to the chromaticity zone of NTSC.

Figure 5:
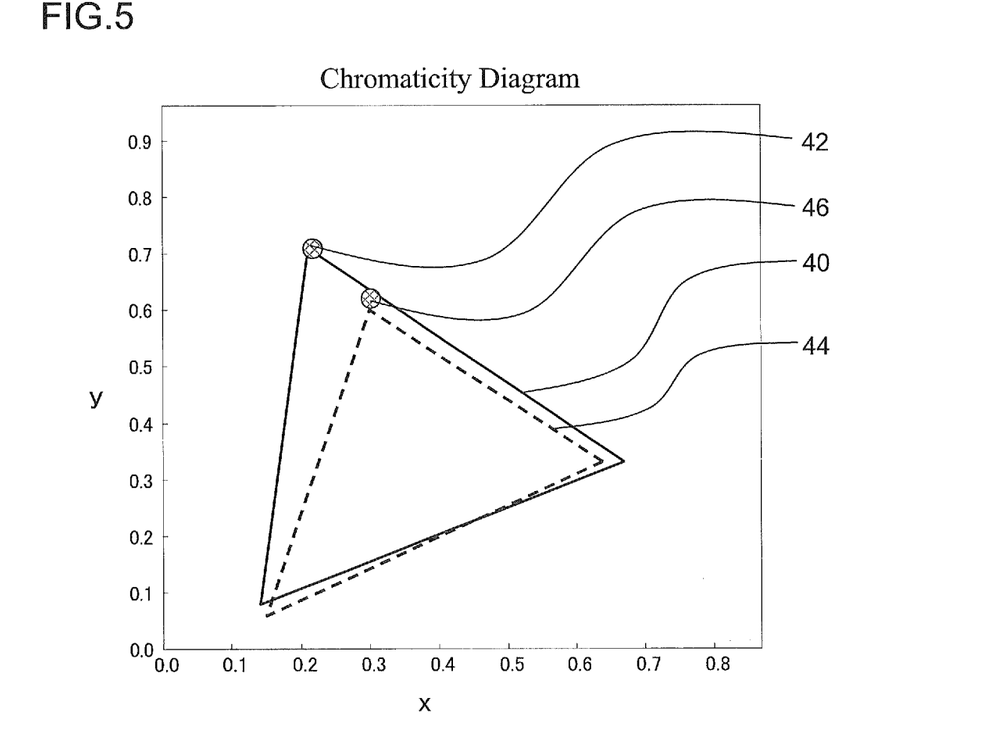
FIG. 5 is a chromaticity diagram showing chromaticity coordinates (x, y) as variables.

FIG. 5 is a chromaticity diagram showing chromaticity coordinates (x, y) as variables. In the chromaticity diagram, a dotted-line triangle indicates chromaticity zone 44 of sRGB, and a solid-line triangle indicates chromaticity zone 40 of NTSC. Green light corresponding to chromaticity zone 44 of sRGB is, for example, reference numeral 46 shown in FIG. 5, and green light corresponding to chromaticity zone 40 of NTSC is, for example, reference numeral 42 shown in FIG. 5.

To reproduce all colors in chromaticity zone 40 of NTSC, green light 42 is synthesized with red or blue light at arbitrary intensity. Colors in chromaticity zone 44 of sRGB can be reproduced by synthesizing green light 42 of NTSC with red or blue light. In this case, however, to reproduce the colors in chromaticity zone 44 of sRGB, the amount of red or blue light must always be maintained large. When the illumination optical system shown in FIG. 4 is used, green light 46 of sRGB can be directly emitted by switching the wavelength of fluorescent light. This prevents the red or blue light from being emitted. Thus, by applying the illumination optical system to a device such as a projector that synthesizes the lights of respective colors to form a color image, light losses can be reduced, and power consumption can be reduced.

In the device such as a projector, the data of a video to be displayed can be analyzed, and an irradiation spot can be switched to be located over another fluorescent body according to color information to be displayed.

Figure 6:
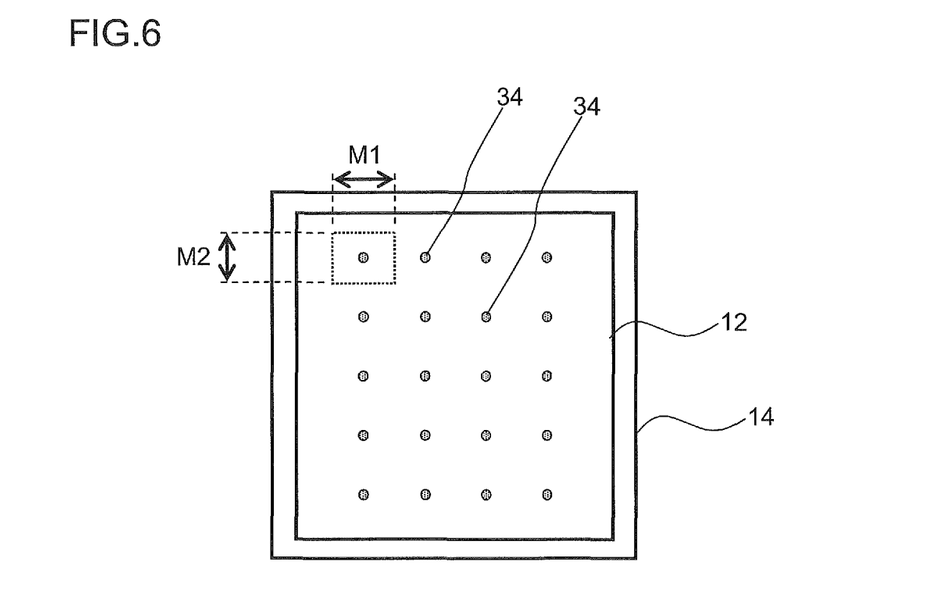
FIG. 6 is a schematic view showing a fluorescent body unit included in an illumination optical system according to a third embodiment.

FIG. 6 shows a fluorescent body unit included in an illumination optical system according to a third embodiment. The illumination optical system according to the third embodiment includes a plurality of laser light sources for emitting excitation light. In FIG. 6, the laser light sources are arranged in 4 columns and 5 rows. Irradiation spots 34 equal in number to the laser light sources are located over fluorescent body 12.

If irradiation spot 34 of a laser beam is narrowed by a lens or an optical fiber, light energy at irradiation spot 34 becomes very large, sharply increasing the temperature of fluorescent body 12. This may create a problem of deterioration of the fluorescent body within a short time. As in the case of the embodiment, by using the plurality of laser light sources, the amount of light radiated from fluorescent body 12 can be increased while the diameter of irradiation spot 34 is maintained at a certain size.

Figure 7:
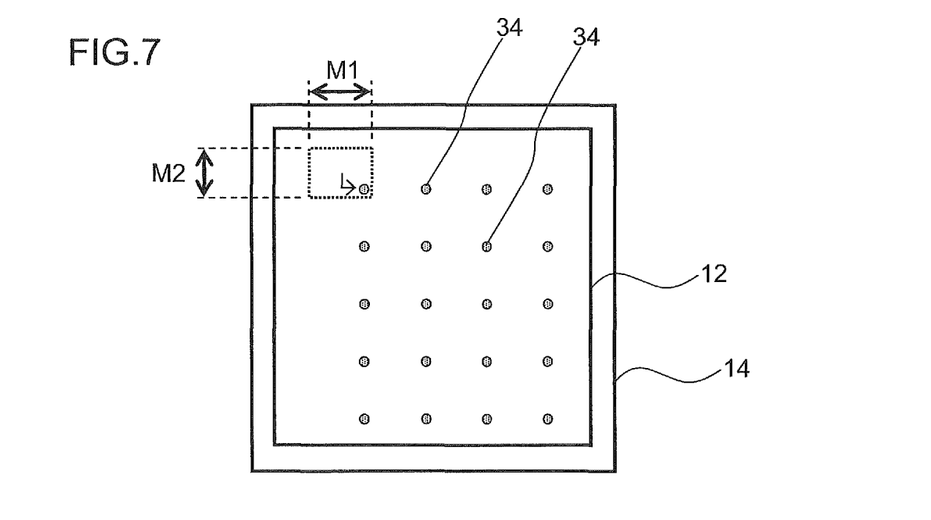
FIG. 7 is a schematic view showing a change in relative position between an irradiation spot and a fluorescent body in the illumination system shown in FIG. 6.

As in the case of the first embodiment, driving mechanism 20 intermittently changes the relative positions of plate 14 and irradiation spot 12 at predetermined timing so that irradiation spot 34 of the excitation light can move over fluorescent body 12 (refer to FIG. 7). The moving range of plate 14 or irradiation spot 34 is a range that does not overlap an adjacent irradiation spot, namely, the range of an area obtained by dividing the entire region of the fluorescent body with the number of laser light sources (M1×M 2).

For example, it is assumed that irradiation spot 34 of the excitation light is formed into a circular shape having a diameter of 1 mm and an interval between irradiation spots 34 is 10 mm. In this case, the plate or the irradiation spot only needs to be moved within the range of a region of 10 mm×10 mm with respect to one irradiation spot. This region is larger by about 100 times than the area of the irradiation spot. Accordingly, the service life of the illumination optical system is longer by about 100 times than that of fluorescent body 12 when irradiation spot 34 is not moved.

Figure 8:
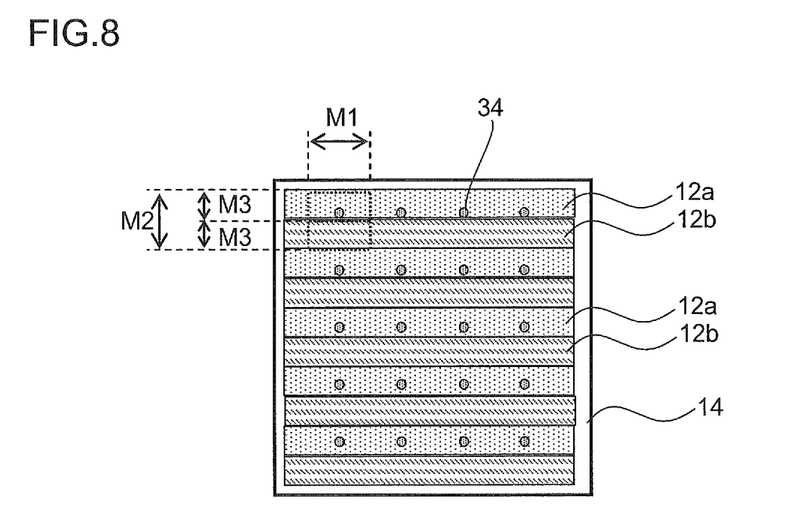
FIG. 8 is a schematic view showing a fluorescent body unit included in an illumination optical system according to a fourth embodiment.

FIG. 8 shows a fluorescent body unit included in an illumination optical system according to a fourth embodiment. As in the case of the third embodiment, the illumination optical system according to the fourth embodiment includes a plurality of laser light sources for emitting excitation light. In FIG. 8, a plate 2 includes two types of fluorescent bodies 12a and 12b. First fluorescent body 12a and second fluorescent body 12b are arranged in a stripe shape.

Figure 9:
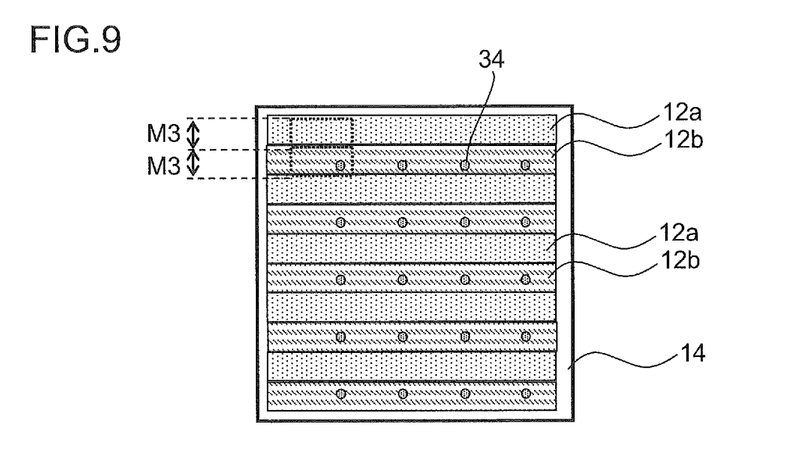
FIG. 9 is a schematic view showing a change in relative position between an irradiation spot and a fluorescent body in the illumination system shown in FIG. 8.

A driving mechanism intermittently changes the relative positions of plate 14 and irradiation spot 34 at predetermined timing so that irradiation spot 34 of the excitation light can move over fluorescent bodies 12a and 12b (refer to FIG. 9). The moving range of the plate or the irradiation spot is a range that does not overlap an adjacent irradiation spot, namely, the range of an area obtained by dividing the entire region of the fluorescent body with the number of laser light sources (M 1×M 2). Within the range ((M 1×M 2), the two types of fluorescent bodies 12a and 12b are located. By vertically moving plate 14 by about a distance M3, irradiation spot 34 of the excitation light is switched between first fluorescent body 12a and second fluorescent body 12b. This can provide the same effects as those of the illumination optical system of the second embodiment.

Figure 10:
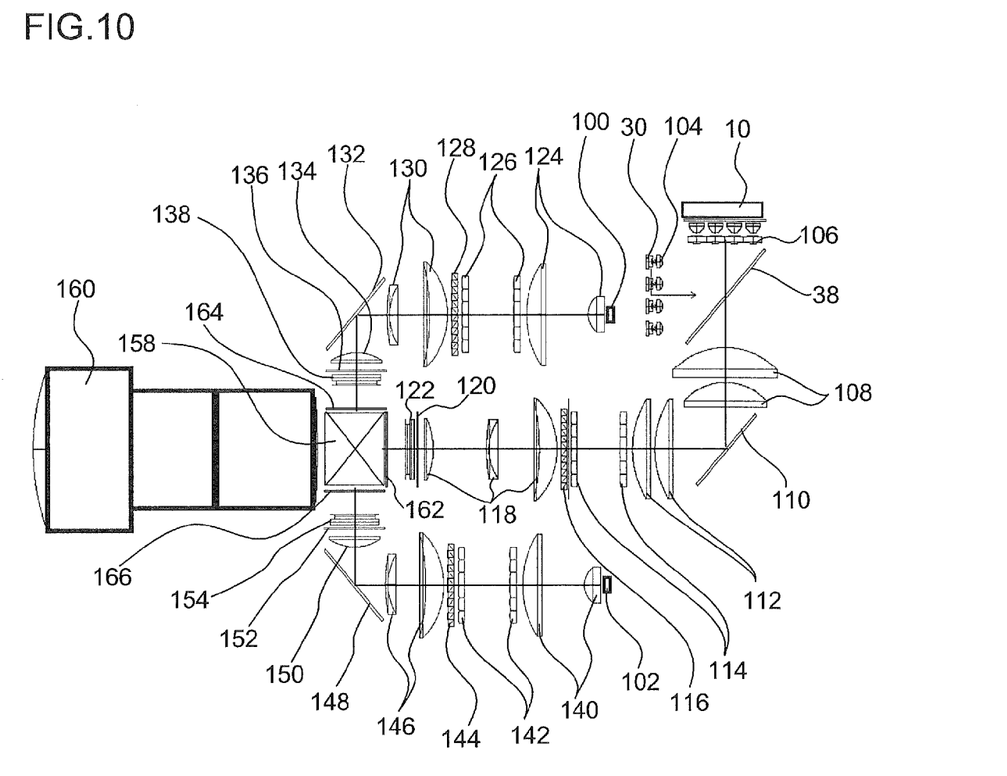
FIG. 10 is a schematic view showing the example of the configuration of a LCD projector including an illumination optical system.

Next, a liquid crystal projector including an illumination optical system will be described. FIG. 10 is a schematic view showing the example of the configuration of a LCD projector. This projector uses, as light sources for emitting green light, those of the embodiments, particularly, illumination optical systems 10, 30, and 38 shown in FIG. 6 or FIG. 8. The projector further includes LED light source 100 for emitting red light and LED light source 102 for emitting blue light.

Excitation light from laser light source 30 of the illumination optical system is converted into parallel light by collimator lens 104, and reflected by dichroic mirror 38. Dichroic mirror 38 reflects the excitation light while transmitting green fluorescent light. The light reflected by dichroic mirror 38 is condensed on fluorescent body unit 10 by collimator lens 106.

The fluorescent body radiates green light by irradiation with the excitation light. The green light is roughly converted into parallel light by collimator lens 106 to pass through dichroic mirror 38. The green light that passes through dichroic mirror 38 is condensed near reflection mirror 110 by condenser lens 108, and reflected by reflection mirror 110. The green light spreading again is roughly converted into parallel light by condenser lens 112 to enter lens array 114.

The green light that has entered lens array 114 is aligned in a polarizing direction by PS converter 116. Then, the green light passes through condenser lens 118 or polarization plate 120 to enter LCD 122 for green light.

Red light emitted from LED light source 100 passes through condenser lens 124 to enter lens array 126. The red light that has entered lens array 126 is aligned in a polarizing direction by PS converter 128. Then, the red light passes through condenser lens 130, is reflected by reflection mirror 132, and then passes through condenser lens 134 or polarization plate 136 to enter LCD 138 for red light.

Blue light emitted from LED light source 102 passes through condenser lens 140 to enter lens array 142. The red light that has entered lens array 142 is aligned in a polarizing direction by PS converter 144. Then, the blue light passes through condenser lens 146, is reflected by reflection mirror 148, and then passes through condenser lens 150 or polarization plate 152 to enter LCD 154 for blue light.

The lights respectively passed through LCD 122 for green light, LCD 138 for red light, and LCD 154 for blue light enter cross dichroic prism 158 via different polarization plates 162, 164, and 166. These lights are synthesized at cross dichroic prism 158 to be projected in the same direction, and an image is formed on a screen by projection lens 160. Accordingly, a color image can be displayed on the screen.

In the example of the projector shown in FIG. 10, the illumination optical system of the embodiment is used for the green light. However, the illumination optical system of the embodiment can be used for the blue light or the red light. At least one of the illumination optical systems of the embodiments needs to be used corresponding to at least one of the green light, the blue light, and the red light.

By using the illumination optical system shown in FIG. 4 or FIG. 8 for the green light, a projector that can switch the sRGB and the NTSC can be provided with limited light losses and low power consumption.

Figure 11:
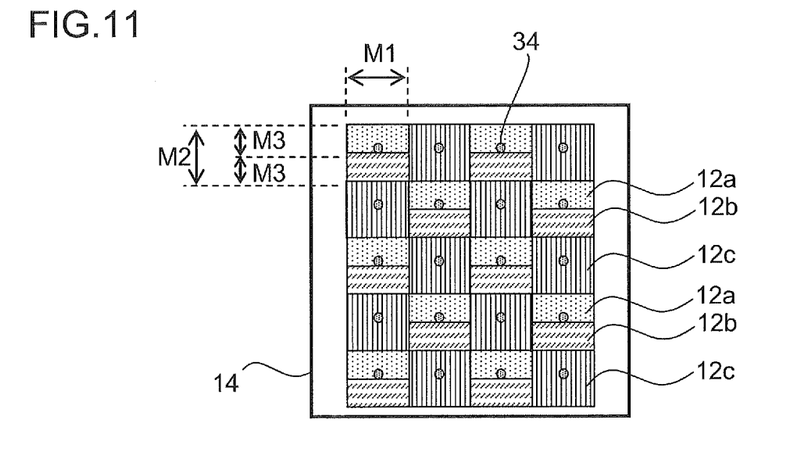
FIG. 11 is a schematic view showing a fluorescent body unit included in an illumination optical system according to a fifth embodiment.

FIG. 11 shows a fluorescent body unit included in an illumination optical system according to a fifth embodiment. As in the case of the third embodiment, the illumination optical system according to the fifth embodiment includes a plurality of laser light sources for emitting excitation light.

Plate 14 includes three types of fluorescent bodies 12a, 12b, and 12c. As an example, first fluorescent body 12a emits green light of sBGR, and second fluorescent body 12b emits green light of NTSC. Third fluorescent body 12c emits red light. The wavelength of a laser beam for excitation is shorter than those of the lights emitted from fluorescent bodies 12a, 12b, and 12c.

In FIG. 11, laser light sources are arranged in 4 columns and 5 rows. 10 of the 20 laser light sources emit light to fluorescent body 12c that radiates the red light, and the other 10 emit light to fluorescent bodies 12a and 12b that radiate green light.

Figure 12:
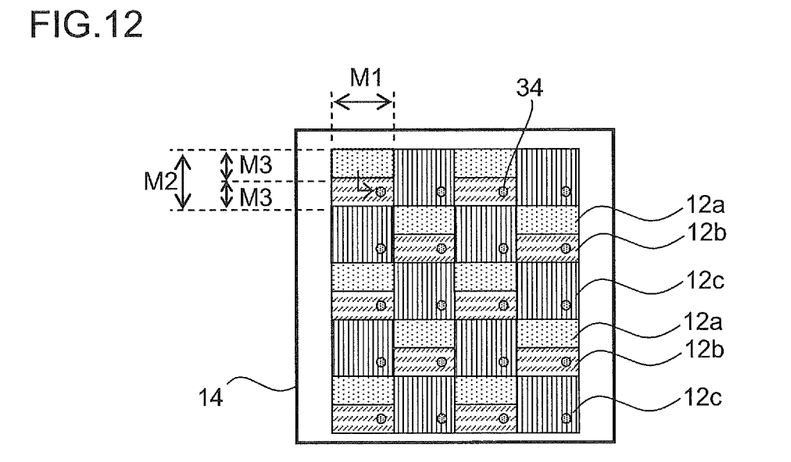
FIG. 12 is a schematic view showing a change in relative position between an irradiation spot and a fluorescent body in the illumination system shown in FIG. 11.

Driving mechanism 20 intermittently changes the relative positions of plate 14 and irradiation spot 34 at predetermined timing so that irradiation spot 34 of the excitation light can move over fluorescent bodies 12a, 12b and 12c (refer to FIG. 12). The moving range of plate 14 or irradiation spot 34 is a range that does not overlap an adjacent irradiation spot, namely, the range of an area obtained by dividing the entire region of the fluorescent body with the number of laser light sources (M1×M2).

The total of the region (M1×M2) of the fluorescent body in which first fluorescent body 12a is located and the region (M1×M2) in which second fluorescent body 12b is located is equal to the area of the region (M1×M2) in which third fluorescent body 12c is located. The illumination optical system can simultaneously generate the green light and the red light, or can independently generate the green light and the red light in time sharing. By moving plate 14, irradiation spot 34 of the excitation light moves between first fluorescent body 12a and second fluorescent body 12b. This enables switching between the sRGB and the NTSC. At this time, third fluorescent body 12c is irradiated with the excitation light, and the red light continuously exits.

Referring to FIG. 11, the illumination optical system including the three types of fluorescent bodies has been described. However, four or more types of fluorescent bodies can be employed. The wavelength of fluorescent light emitted from each fluorescent body can be appropriately set according to the purpose of the illumination optical system. For example, the illumination optical system can include a fluorescent body that emits green light, a fluorescent body that emits red light, and a fluorescent body that emits blue light.

Figure 13:
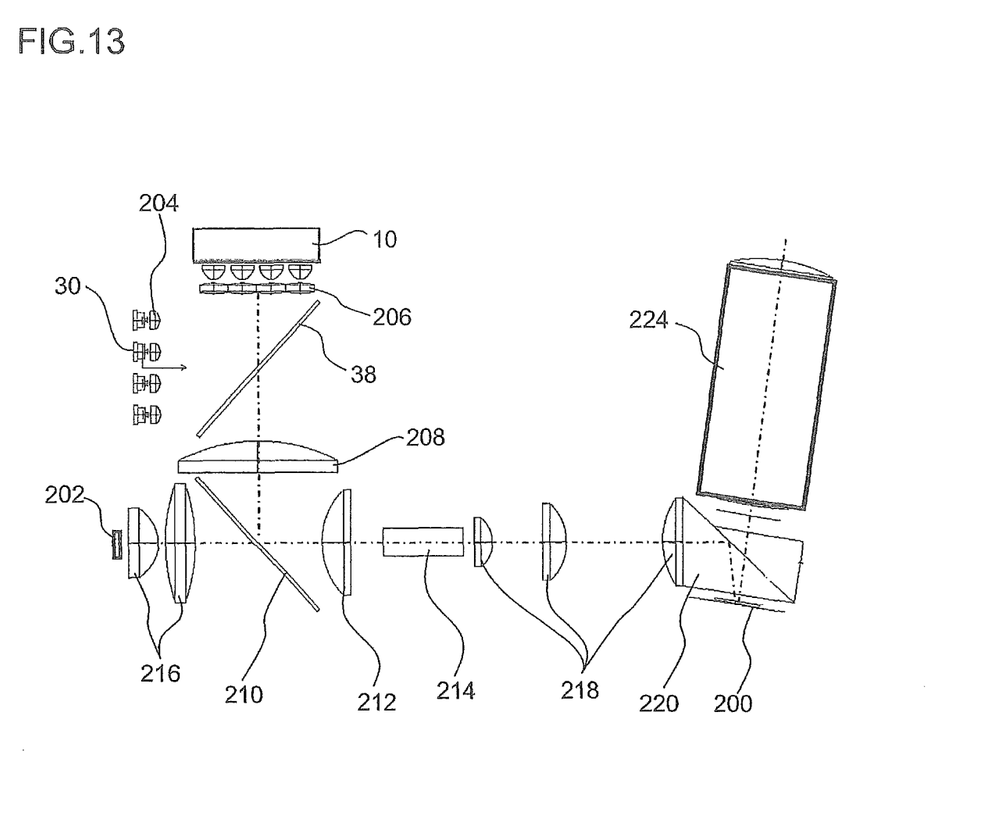
FIG. 13 is a schematic view showing the example of the configuration of a DLP projector including an illumination optical system.

Next, a DLP projector including an illumination optical system will be described. FIG. 13 is a schematic view showing the example of the configuration of the DLP projector. The DLP projector, which includes digital mirror device (DMD) 200, projects red light, green light, and blue light in time division to display a color image. As an example, illumination optical systems 10, 30, and 38 shown in FIG. 11 are used corresponding to the green light and the red light. As a light source corresponding to the blue light, LED light source 202 is used.

Excitation light from laser light source 30 for excitation is converted into parallel light by collimator lens 204, and reflected by dichroic mirror 38. Dichroic mirror 38 reflects the excitation light while transmitting the red light and the green light, namely, fluorescent light from fluorescent body unit 10.

The excitation light reflected by dichroic mirror 38 is condensed on the fluorescent body by collimator lens 206. As shown in FIG. 11, fluorescent body unit 10 includes one type of fluorescent body 12c for emitting red light and two types of fluorescent bodies 12a and 12b for emitting green light. Some of a plurality of irradiation spots 34 of the excitation light are located over fluorescent body 12c for red light, while other irradiation spots 34 are located over one of fluorescent bodies 12a and 12b for green light.

When fluorescent bodies 12a, 12b, and 12c are excited by the excitation light, red light and green light are radiated. The radiated fluorescent light is roughly converted into parallel light by collimator lens 206, and transmitted through dichroic mirror 38.

The light transmitted through dichroic mirror 38 is passed through condenser lens 208, reflected by another dichroic mirror 210, and then transmitted through condenser lens 212 to be condensed near the incident end of light tunnel 214. Dichroic mirror 210 transmits the blue light while reflecting the red light and the green light.

The blue light output from LED light source 202 is transmitted through condenser lens 216 and dichroic mirror 210, and further transmitted through condenser lens 212 to be condensed near the incident end of light tunnel 214.

The light of each color incident on light tunnel 214 is multiply-reflected in light tunnel 214 to exit from it, and then transmitted through condenser lens 218 to enter TIR prism 220. The light incident on TIR prism 220 is reflected on the air gap surface of the prism to change its traveling direction, and then exits toward DMD 200.

Figure 14:
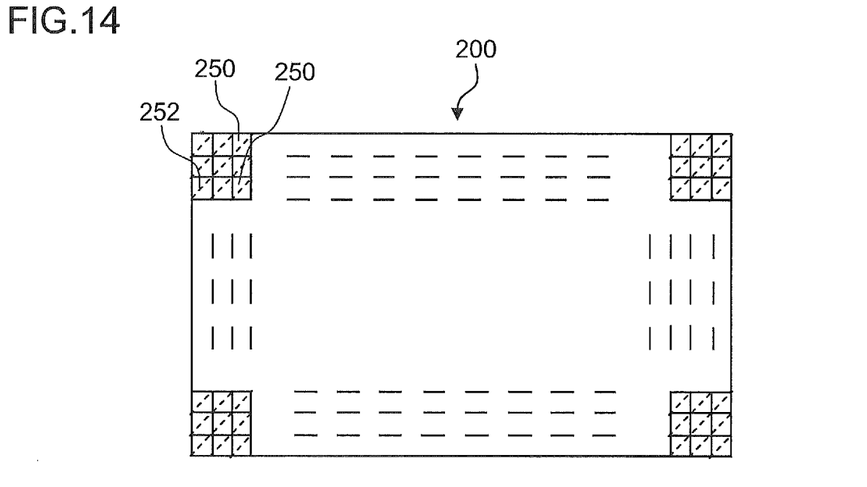
FIG. 14 is a schematic view showing the configuration of a DMD.

As shown in FIG. 14, DMD 200 includes micromirrors (very small mirrors) 250 arranged in a matrix corresponding to respective pixels. For simplicity, only some micromirrors 250 are shown. Each micromirror 250 is configured to be rotatable around rotational axis 252. In the embodiment, micromirror 250 rotates by ±12 degrees.

Figure 15:
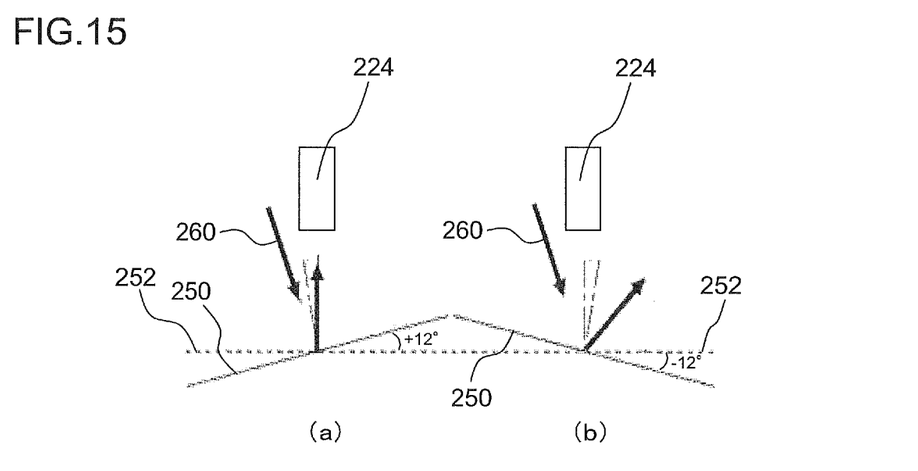
FIG. 15 is schematic views each showing the operation of a micromirror constituting the DMD.

Each of FIG. 15 shows the operation of micromirror 250. Incident light 260 incident on micromirror 250 inclined by +12 degrees is reflected in a direction in which projection lens 224 is located (refer to FIG. 15 (a)). The light incident on projection lens 224 is projected to the outside of the projector. Incident light 260 incident on micromirror 250 inclined by −12 degrees is reflected in a direction in which projection lens 224 is not located (refer to FIG. 15 (b)). Accordingly, micromirror 250 selects whether to project light corresponding to each pixel to the outside of the projector. Executing such control for the light of each color by DMD 200 enables the projector to project a color image.

The embodiments of the present invention have been described in detail. However, the present invention is not limited to the embodiments. Various changes or modifications can be made without departing from gist of the invention.

REFERENCE NUMERALS

12 Fluorescent body
14 Plate
18 Fluorescent light
20 Driving mechanism
30 Laser light source
32 Excitation light
34 Irradiation spot of excitation light
36 Light collection optical system
38 Dichroic mirror

The invention claimed is:

1. An illumination optical system comprising:
a light source that generates excitation light;
a fluorescent body that generates fluorescent light by irradiation with the excitation light and that is disposed in a region wider than an irradiation spot of the excitation light;
a plate in which the fluorescent body is disposed; and
a driving mechanism that moves the plate so that the irradiation spot of the excitation light can intermittently move over the fluorescent body,
wherein timing of moving the irradiation spot of the excitation light with respect to the fluorescent body is set based on a service life of the fluorescent body.

2. The illumination optical system according to claim 1, wherein the driving mechanism moves the plate in an X direction and a Y direction orthogonal to the X direction so that the irradiation spot of the excitation light can two-dimensionally move over the fluorescent body.

3. The illumination optical system according to claim 1, wherein:
the plate includes a plurality of types of fluorescent bodies which emit fluorescent lights having different wavelengths and each of which is disposed in a region wider than the irradiation spot of the excitation light; and
the driving mechanism moves the plate so that the irradiation spot can intermittently move over the same type of fluorescent body and can move to a different type of a fluorescent body.

4. A projector comprising the illumination optical system according to claim 3.

5. A projector comprising the illumination optical system according to claim 1.

6. A projector comprising the illumination optical system according to claim 2.

7. The illumination optical system according to claim 1, wherein the fluorescent body radiates green light by irradiation with the excitation light.

8. An illumination optical system comprising:
a light source that generates excitation light;
a fluorescent body that generates fluorescent light by irradiation with the excitation light and that is disposed in a region wider than an irradiation spot of the excitation light;
a plate in which the fluorescent body is disposed;
a driving mechanism that moves the plate so that the irradiation spot of the excitation light can intermittently move over the fluorescent body; and
a temperature sensor for measuring a temperature of the fluorescent body,
wherein timing of moving the irradiation spot of the excitation light with respect to the fluorescent body is set based on a service life of the fluorescent body, the temperature of the fluorescent body, and power of the excitation light.

9. The illumination optical system according to claim 8, wherein the driving mechanism moves the plate in an X direction and a Y direction orthogonal to the X direction so that the irradiation spot of the excitation light can two-dimensionally move over the fluorescent body.

10. The illumination optical system according to claim 8, wherein:
the plate includes a plurality of types of fluorescent bodies which emit fluorescent lights having different wavelengths and each of which is disposed in a region wider than the irradiation spot of the excitation light; and
the driving mechanism moves the plate so that the irradiation spot can intermittently move over the same type of fluorescent body and can move to a different type of a fluorescent body.

11. A projector comprising the illumination optical system according to claim 8.

12. The illumination optical system according to claim 8, wherein the fluorescent body radiates green light by irradiation with the excitation light.

13. A method for generating fluorescent light, comprising:
irradiating a fluorescent body with excitation light, the fluorescent body being disposed in a region of a plate wider than an irradiation spot of the excitation light; and
moving the plate at timing that is set based on a service life of the fluorescent body, so that the irradiation spot of the excitation light can intermittently move over the fluorescent body.

* * * * *